US012675689B2

(12) United States Patent
Shen et al.

(10) Patent No.: US 12,675,689 B2
(45) Date of Patent: Jul. 7, 2026

(54) MULTI-DOMAIN FEATURE ENHANCEMENT FOR TRANSFER LEARNING (FTL)

(71) Applicant: PAYPAL, INC., San Jose, CA (US)

(72) Inventors: Zhida Shen, San Jose, CA (US); Suraj Jayakumar, San Jose, CA (US); Amit Kumar Bansal, Sunnyvale, CA (US); Chao Cheng, Milpitas, CA (US)

(73) Assignee: PayPal, Inc., San Jose, CA (US)

( * ) Notice: Subject to any disclaimer, the term of this patent is extended or adjusted under 35 U.S.C. 154(b) by 1108 days.

(21) Appl. No.: 17/689,600

(22) Filed: Mar. 8, 2022

(65) Prior Publication Data

US 2023/0289587 A1    Sep. 14, 2023

(51) Int. Cl.
*G06N 3/08* (2023.01)
*G06Q 20/10* (2012.01)

(52) U.S. Cl.
CPC .............. *G06N 3/08* (2013.01); *G06Q 20/10* (2013.01)

(58) Field of Classification Search
CPC .......... G06N 3/08; G06N 20/00; G06Q 20/10; G06Q 20/4016; G06Q 40/00; G06Q 90/00
See application file for complete search history.

(56) References Cited

U.S. PATENT DOCUMENTS

2014/0358826 A1* 12/2014 Traupman .............. G06N 20/00
                                                           706/46
2018/0218284 A1*  8/2018 Jawahar ................. G06N 3/082

2020/0045066 A1*  2/2020 Meng ..................... G06N 3/096
2021/0110306 A1*  4/2021 Krishnan ................. G06N 3/08
2023/0043702 A1*  2/2023 Sells ..................... G06Q 40/03

OTHER PUBLICATIONS

Bousmalis, K. et al., "Domain Separation Networks", https://arxiv.org/abs/1608.06019 (Year: 2016).*
Bhatt, H. et al., "Learning Transferable Feature Representations Using Neural Networks", https://aclanthology.org/P19-1404/ (Year: 2019).*

* cited by examiner

*Primary Examiner* — Alexey Shmatov
*Assistant Examiner* — Devika S Maharaj
(74) *Attorney, Agent, or Firm* — Haynes and Boone, LLP

(57) ABSTRACT

Methods and systems are presented for configuring and training a machine learning model using transfer learning techniques that can transfer knowledge among multiple domains that do not share an identical feature set. Instead of using any feature set associated with a domain, a feature arrangement that combines all of the feature sets associated with the multiple domains in a particular organization for configuring and training the machine learning model. The feature arrangement includes a domain independent section and multiple domain-specific sections corresponding to the multiple domains. The domain independent section includes common features that are common across the multiple domains. Each of the domain-specific sections includes a feature set associated with the corresponding domain. The machine learning model that is configured in this manner can be trained to learn knowledge across the multiple domains and subsequently perform tasks for the multiple domains.

20 Claims, 10 Drawing Sheets

500

| Training Data Sets | F1-F3 | (F1-F3) + (F4-F5) | (F1-F3) + (F6-F7) | (F1-F3) + (F8-F9) |
|---|---|---|---|---|
| | 502 | 504 | 506 | 508 |
| Domain A (512) | ✖ | ✖ | | |
| Domain B (514) | ✖ | | ✖ | |
| Domain C (516) | ✖ | | | ✖ |

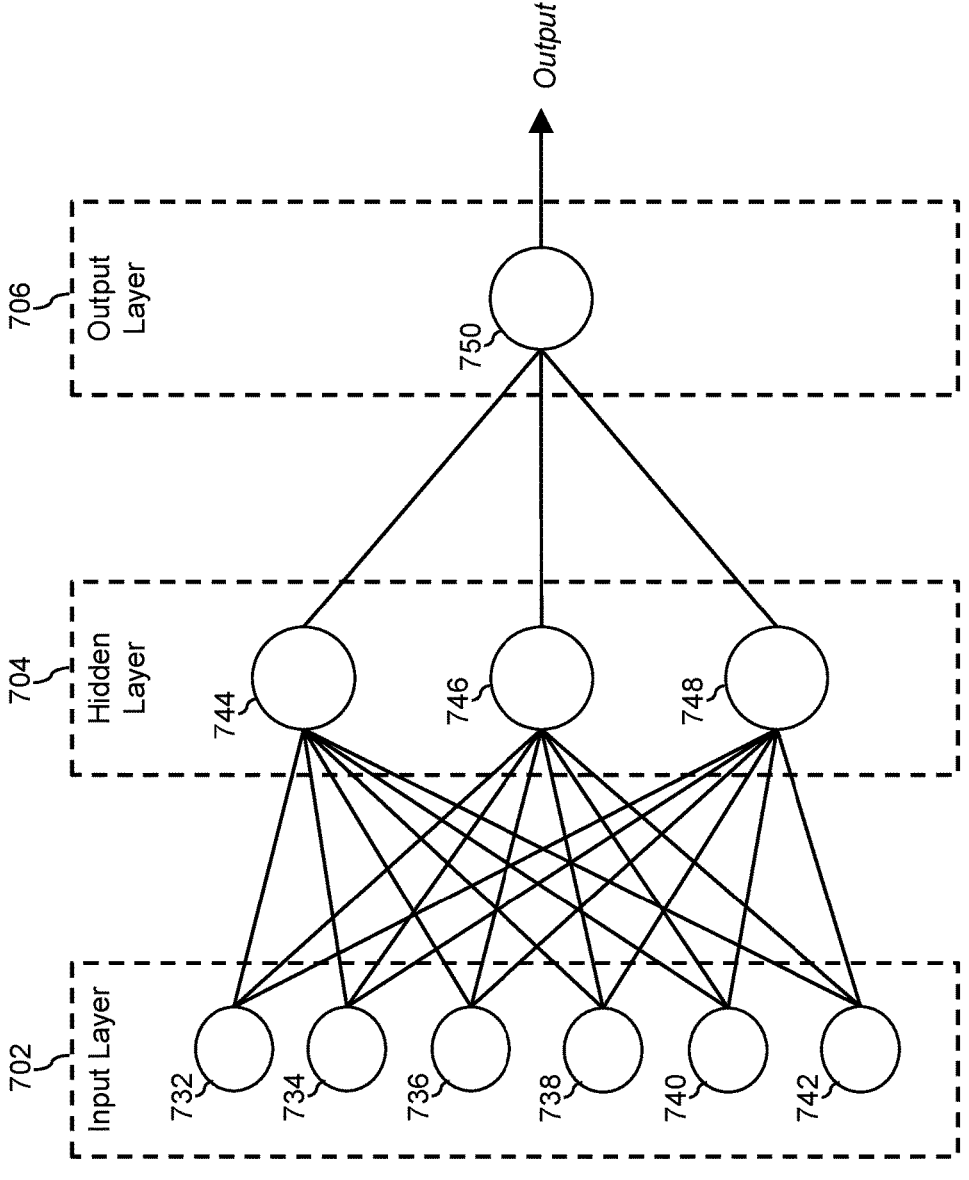
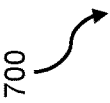
Figure 7

800

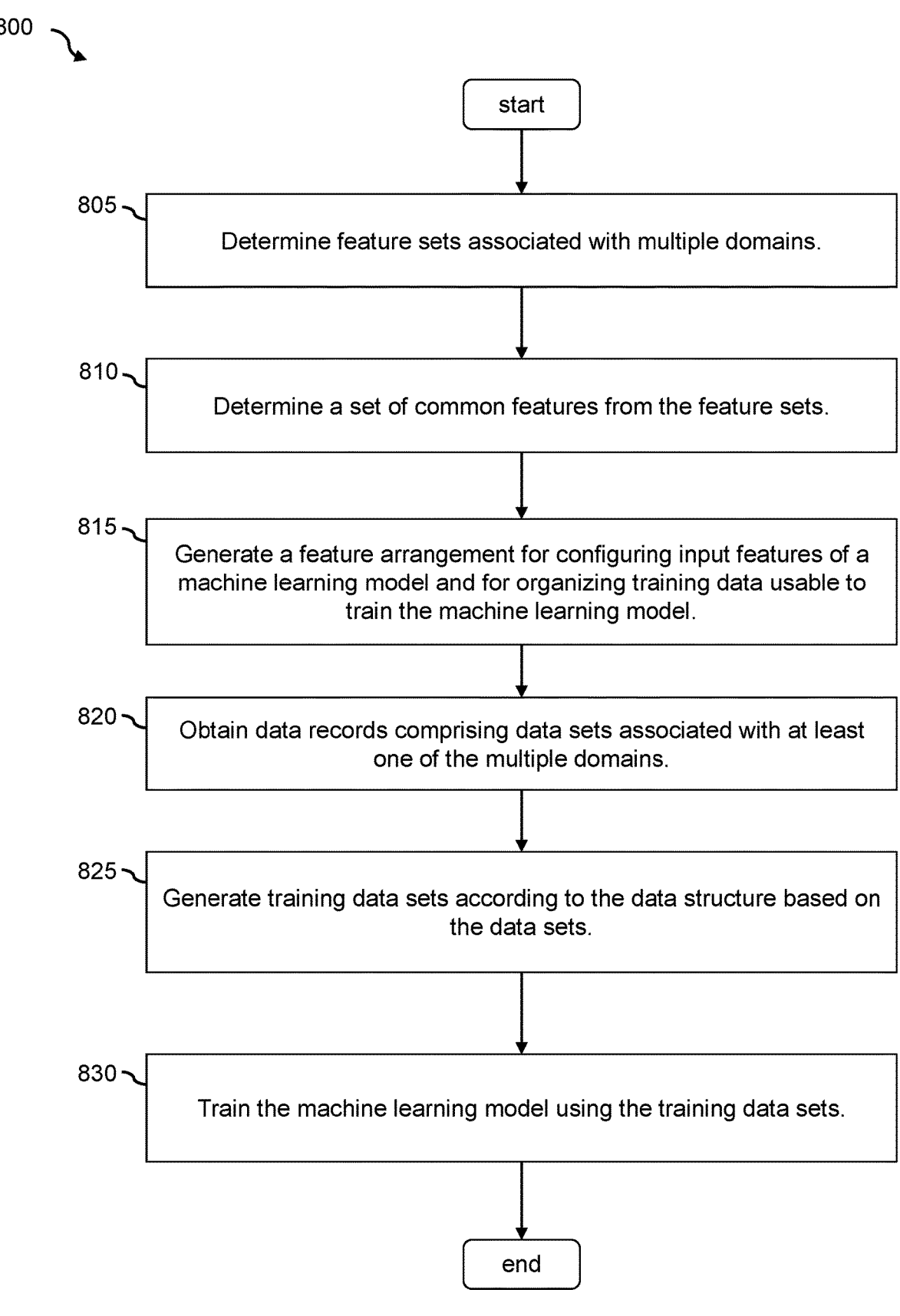

805 — Determine feature sets associated with multiple domains.

810 — Determine a set of common features from the feature sets.

815 — Generate a feature arrangement for configuring input features of a machine learning model and for organizing training data usable to train the machine learning model.

820 — Obtain data records comprising data sets associated with at least one of the multiple domains.

825 — Generate training data sets according to the data structure based on the data sets.

830 — Train the machine learning model using the training data sets.

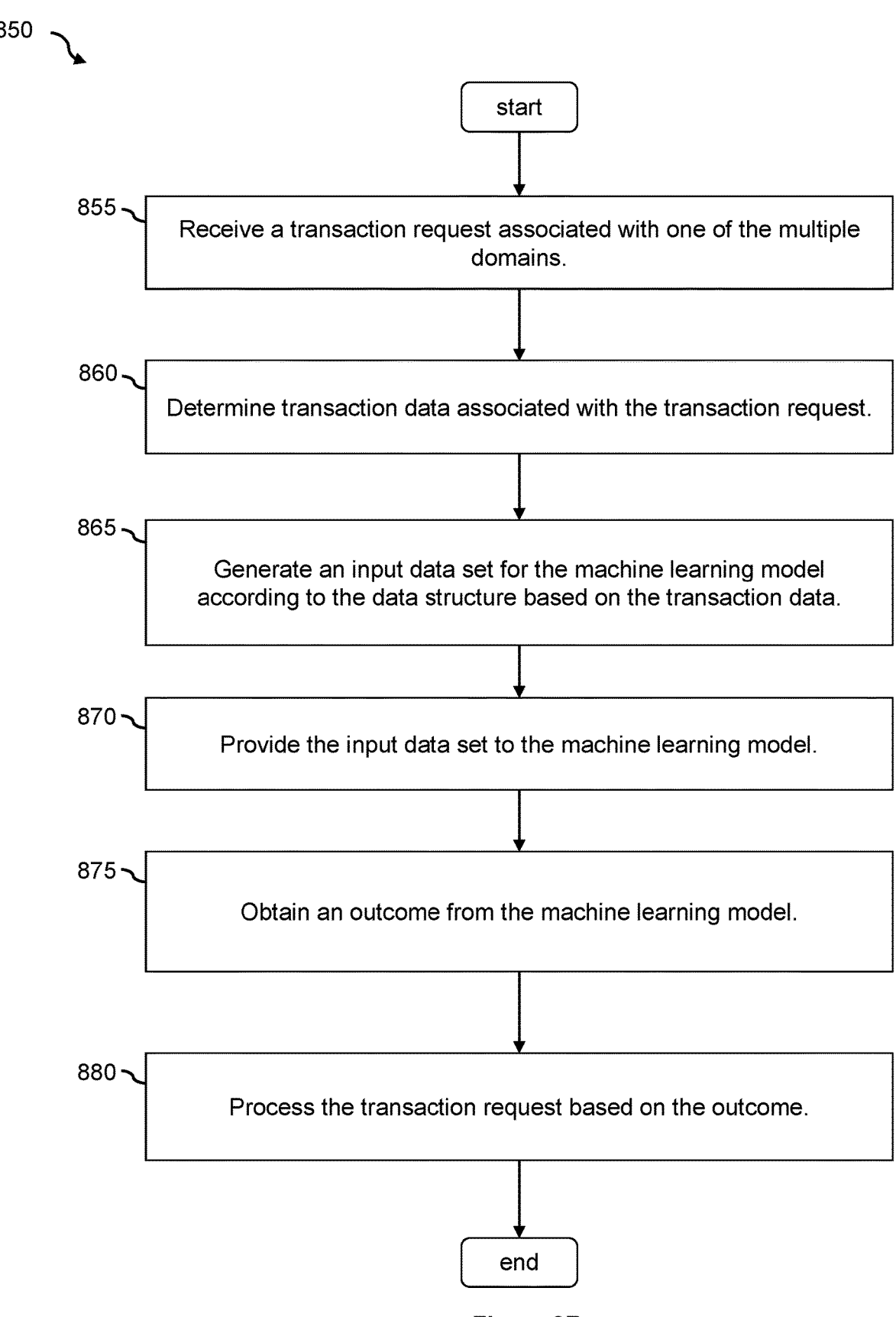

start

855 — Receive a transaction request associated with one of the multiple domains.

860 — Determine transaction data associated with the transaction request.

865 — Generate an input data set for the machine learning model according to the data structure based on the transaction data.

870 — Provide the input data set to the machine learning model.

875 — Obtain an outcome from the machine learning model.

880 — Process the transaction request based on the outcome.

end

MULTI-DOMAIN FEATURE ENHANCEMENT FOR TRANSFER LEARNING (FTL)

BACKGROUND

The present specification generally relates to machine learning, and more specifically, to providing data structures for organizing training data to facilitate transfer learning of a machine learning model according to various embodiments of the disclosure.

RELATED ART

Machine learning models have been widely used to perform various tasks for different reasons. For example, machine learning models may be used in classifying data (e.g., determining whether a transaction is a legitimate transaction or a fraudulent transaction). To construct a machine learning model, a set of input features that are related to performing a task associated with the machine learning model are identified. Training data that includes attribute values corresponding to the set of input features and labels corresponding to pre-determined prediction outcomes may be provided to train the machine learning model. Based on the training data and labels, the machine learning model may learn patterns associated with the training data, and provide predictions based on the learned patterns. For example, new data (e.g., transaction data associated with a new transaction) that corresponds to the set of input features may be provided to the machine learning model. The machine learning model may perform a prediction for the new data based on the learned patterns from the training data.

While machine learning models are effective in learning patterns and making predictions, their accuracy performance is dependent on the availability and the quality of training data provided to the machine learning models. In other words, the lack of quality and/or quantity of training data may lead to undesirable or inaccurate performance results from the machine learning models. To improve the accuracy performance when there is insufficient training data associated with a particular domain (e.g., a first domain) for training a machine learning model, a transfer learning technique may be used to transfer the learning of a machine learning model from one domain to another domain. Specifically, the machine learning model may be trained using training data associated with a different domain (e.g., a second domain) that is similar to the first domain. For example, the first domain may be associated with a first task of detecting login transaction risk associated with a first website and the second domain may be associated with a second task of detecting login transaction risk associated with a second website. The similarity between the first and second domains allows the knowledge derived from the training data associated with the second domain to be used in the first domain (e.g., to detect login transaction risk associated with the first website). Using the transfer learning technique, the task of detecting the login transaction risk associated with the first website may be improved based on the knowledge derived from the training data associated with the second website.

However, conventional transfer learning techniques can only be used when the two domains share identical input features, such that a machine learning model that is trained using the training data associated with the second domain can be used to perform the first task associated with the first domain, and vice versa. When the two domains are related (where knowledge from one domain can benefit the task associated with the other domain), but do not share identical input features, conventional transfer learning techniques would fail. As such, there is a need for providing a more flexible transfer learning mechanism for transferring knowledge among machine learning models that may not share identical input features.

BRIEF DESCRIPTION OF THE FIGURES

FIG. 7 illustrates an example neural network that can be used to implement a machine learning model according to an embodiment of the present disclosure;

FIG. 8A is a flowchart showing a process of configuring and training a machine learning model according to an embodiment of the present disclosure;

FIG. 8B is a flowchart showing a process of using a machine learning model according to an embodiment of the present disclosure.

Figure 1:
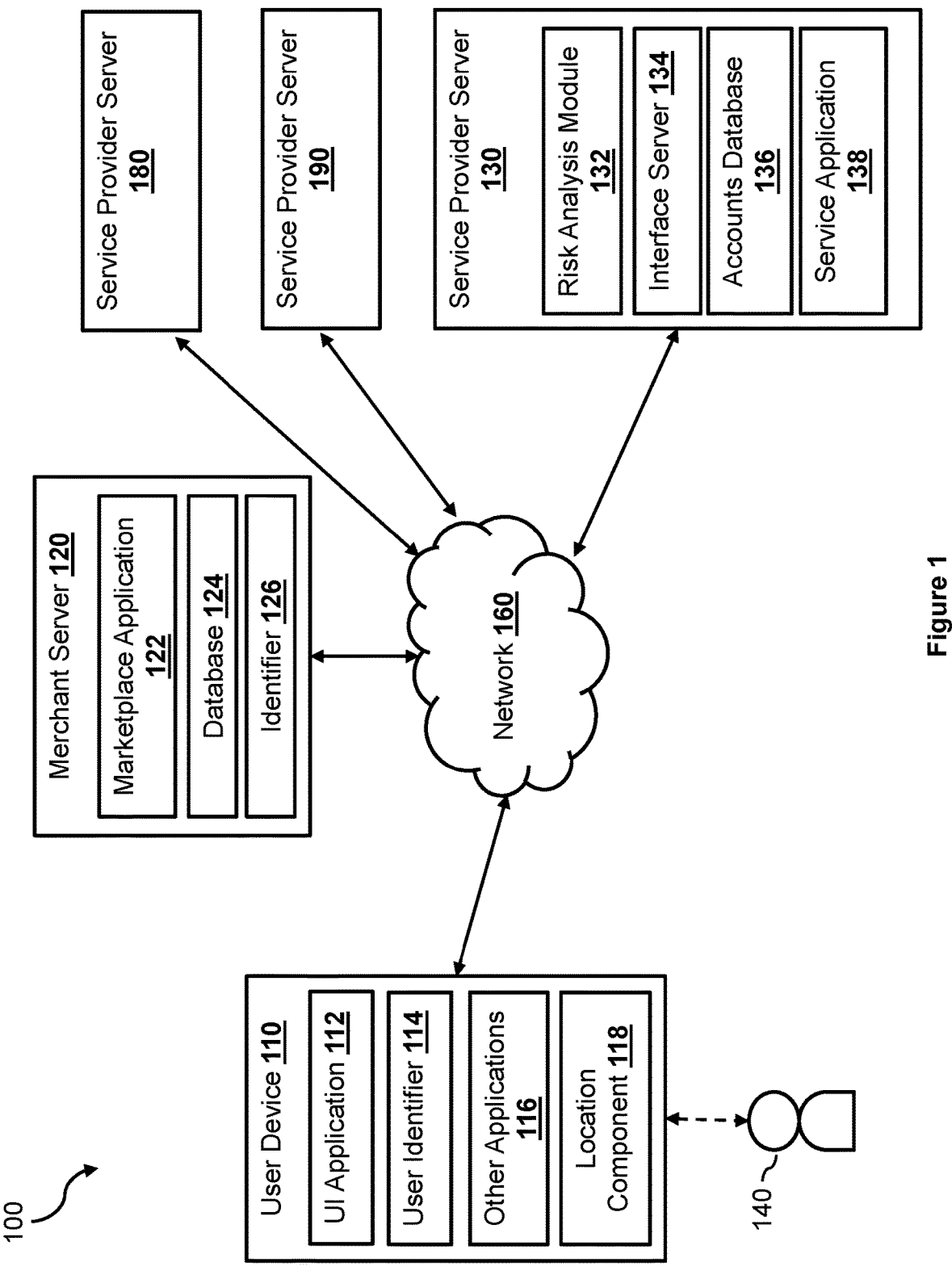
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for configuring and training a machine learning model using transfer learning techniques that can transfer knowledge among different domains that do not share an identical feature set. As defined herein, a domain is associated with a particular task that can be performed by a machine learning model. For example, a domain may be associated with predicting a risk of a transaction request submitted via a first website. Another domain may be associated with predicting a risk of a transaction request (e.g., a login request, a payment request, etc.) submitted via a second website. Yet another domain may be associated with determining a credit worthiness of a user who is applying for using a financial product. Conventionally, a machine learning model that is configured to perform a task associated with a domain is trained using training data associated with the domain. Using the example where the domain is associated with predicting a risk of a transaction request submitted via a first website, the machine learning model that is configured to predict such a risk may be trained using transaction data associated with historic transaction requests submitted via the first website. The machine learning model may learn patterns or other types of knowledge from the transaction data to perform risk prediction associated with new transaction requests. However, as discussed herein, due to various reasons, it is often desirable to train a machine learning model using training data across multiple domains such that the machine learning model may improve the accuracy performance based on knowledge derived from other domains. For example, when there is a lack of training data associated with the first domain, the machine learning model may be trained using training data associated with a second domain that is related to the first domain—the second domain predicting a risk of a transaction request submitted via the second website.

Since the two domains are related, the risk prediction knowledge associated with the second domain can be transferred for use in the first domain, such that the machine learning model associated with the first domain can benefit by knowledge derived from training data associated with the second domain. In this example, the types of data (also referred to as "features" or "input features") that can be used to perform the tasks associated with the two domains (e.g., predicting the risk of transaction requests associated with the first and second websites) may be identical. For example, to predict a risk of a login transaction request for either the first website or the second website, one would require input features such as a time of day associated with the login transaction request, a time of the previous login transaction request, device attributes of a device used to initiate the login transaction request, frequency of past failed login attempts, or other features. Since the input features for performing the two tasks are identical, transfer learning between the two domains can be performed by using the training data associated with the second domain to train the machine learning model configured to perform the first task of the first domain. The training data associated with the second domain can be provided to the machine learning model without requiring any editing or formatting in this case.

However, in some cases, while the two domains are related to each other, they may have different feature sets. For example, the first task of the first domain may include determining a credit worthiness of a user applying to use a first financial product and the second task of the second domain may include determining a credit worthiness of a user applying to use a second financial product. Since the first and second financial products are similar, the knowledge derived from the second domain can be used to improve the performance of a machine learning model configured to perform the first task of the first domain. However, the first and second financial products may be sufficiently different (e.g., including different characteristics, etc.) or a first set of features used to perform the first task (e.g., determining a credit worthiness of a user applying to use the first financial product) may be different from a second set of features used to perform the second task (e.g., determining a credit worthiness of a user applying to use the second financial product). The two sets of features may share one or more common features as the first and second tasks are similar, but they may also include unique features that are distinct from each other.

In order to facilitate transfer learning between these two domains that do not share an identical feature set, one solution is to configure a machine learning model to only accept the common features, and not the other input features that are not shared by the two domains, as input features for the machine learning model. Such a machine learning model can be trained using training data associated with the first domain and training data associated with the second domain. However, by configuring the machine learning model to accept only the common features, only a portion of the training data (e.g., the portion of the training data corresponding to the common features) would be used by the machine learning model during the training phase, and only a portion of any attribute data associated with a task (e.g., the portion of the attribute data corresponding to the common features) would be accepted as input values for performing the task during runtime. Since the other portions of the training data and attribute data may be relevant in performing the tasks, the removal of such data may cause a degradation of accuracy performance of the machine learning models in performing the respective tasks. Furthermore, while the different domains share the common features in performing the respective tasks, the way that the common features affect the performance of the respective tasks may be different as well. For example, a first common feature may affect the performance of a first task associated with a first domain in a way that may be different from how the first common feature affects the performance of a second task associated with a second domain. In a non-limiting example, a first value corresponding to the first common feature may increase a credit score of the user while performing the first task but may reduce a credit score of the user while performing the second task.

By using the same structure (e.g., the same nodes and connections within a neural network, etc.) for receiving and analyzing the common input features, the machine learning model may treat the common features the same way when performing the different tasks associated with the different domains, and may not be able to distinguish the different ways that the different features may affect the performance of the different tasks. In some cases, due to accepting only a portion of the features and the homogenous treatment of the input features for performing different tasks, the accuracy performance of the machine learning model configured using this transfer learning technique may even be worse than a machine learning model that has not gone through such a transfer learning process (e.g., trained using only the training data associated with a single domain).

As such, according to various embodiments of the disclosure, a risk analysis system may configure a machine learning model that can accept all of the features associated with multiple domains to facilitate transfer learning among multiple domains that may not share an identical feature set. The risk analysis system may first obtain the features associated with the different domains. The risk analysis system may identify features that are common across the different domains and features that are not shared by the different domains. Using the example discussed above where the different domains may be associated with applying for different financial products, the common features may include characteristics of an applicant such as an age, a gender, a credit history, a frequency in change of home addresses, a previous login time, etc. Since the different financial products may have different characteristics and/or may be linked to different services, the non-common features may include the unique characteristics associated with a corresponding financial product and/or the linked services such as historical applications for the corresponding financial product, historical behavior with the linked services, etc.

To facilitate the transfer learning among the different models, the risk analysis system of some embodiments may configure a machine learning model to use all of the features associated with the different domains as input features of the machine learning model. By configuring the machine learning model to accept input values corresponding to all of the features associated with the different domains, the risk analysis system ensures that all of the input values corresponding to the respective set of features can be used by the machine learning model to perform the respective task, resulting in an improved accuracy performance over machine learning models that are configured to only accept the common features. Furthermore, in some embodiments, in order to distinguish the different effects each common feature may have on performing the different tasks associated with the different domains, the risk analysis system may include multiple copies of the common features as input features for the machine learning model. This way, the machine learning model may use different structures (e.g., different sets of nodes with different connections in a neural network, etc.) to analyze and process the common features when performing the different tasks.

In some embodiments, the risk analysis system may determine a feature arrangement for the input features of the machine learning model, based on the common features and the non-common features associated with the different domains. In one example, the data arrangement may include a domain independent section and multiple domain-specific sections. The domain independent section may include the common features. Each of domain-specific sections may correspond to a distinct domain and may include a set of features that is specific to the corresponding domain. The set of features included in each domain-specific section may also include the common features as well as other features that are associated with the domain and are not included in the common features. As such, the data arrangement may include the set of common features multiple times—one set of common features included in the domain independent section and one set of common features in each of the domain-specific sections. The risk analysis system may configure the input features (e.g., the input nodes) of the machine learning model based on the data arrangement. By configuring the input features of the machine learning model based on the data arrangement, the machine learning model is enabled to (1) have a particular machine learning structure (e.g., nodes and connections in an artificial neural network) to analyze and evaluate the common features as they are applied to all of the multiple domains in a universal manner and (2) have different machine learning structures (e.g., different nodes and connections in the artificial neural network) for analyzing and evaluating the common features (as well as the non-common features) as they are applied to the different domains in different manners.

Since the machine learning model is configured to have its input features (and its corresponding input nodes) based on the data arrangement as discussed herein, the training data associated with any one of the different domains is not compatible with the machine learning model. As such, the risk analysis system may also generate a data structure for storing training data specifically prepared for the machine learning model based on the input features configuration. For example, the data structure may include a domain independent section and multiple domain-specific sections. The domain independent section may include a first set of columns (e.g., a first set of data fields) corresponding to the set of common features. Each of the multiple domain-specific sections may include a set of columns (e.g., a set of data fields) corresponding to the set of features associated with the domain (including the common features and the non-common features).

The risk analysis system may then determine the training data for the machine learning model using the training data associated with the different domains. For example, for each training data associated with a particular domain, the risk analysis system may generate a new training data record within the data structure. The risk analysis system may extract the portion of the training data corresponding to the common features, and may insert the portion of the training data into the domain independent section of the new training data record in the data structure. The risk analysis system may also identify, among the multiple domain-specific sections in the data structure, a particular domain-specific section corresponding to the particular domain associated with the training data. The risk analysis system may then insert the training data (corresponding to both the common features and the non-common features) into the particular domain-specific section of the new training data record. In some embodiments, the risk analysis system may leave blank (or insert default values into) the other domain-specific sections of the new training data record. Using the process described herein, the risk analysis system may continue to generate training data records for the machine learning model based on the data structure using various data associated with the different domains.

Each training data record in the data structure may include actual training data associated with a particular domain inserted in the domain-specific section of the training data record corresponding to the particular domain, and placeholder values (or null) inserted in the domain-specific sections that do not correspond to the particular domain. The risk analysis system may train the machine learning model using the training data record in the data structure. Since every training data record in the data structure, regardless of the associated domain, includes a portion of the training data corresponding to the common record in the domain independent section, the machine learning model may learn during the training phase, from the domain independent section of the training data records, how the common features affect the tasks associated with the different domains universally. The machine learning model may also learn, from each domain-specific section of the training data records, how the common features and the other features affect the particular task in a manner that is specific to the corresponding domain. Since domain-specific sections corresponding to the other domains are left empty (or inserted with placeholder values), the machine learning model may learn to ignore those other domain-specific sections when performing the task associated with the particular domain. Thus, by training the machine learning model in this manner using the training data records generated according to the data structure, the machine learning model may take advantage of the knowledge that is derived from different domains based on the domain independent sections of the training data records without sacrificing knowledge that is specific to the particular domain.

Furthermore, the machine learning model that is configured and trained in this manner can be used to perform the different tasks associated with the different domains. For example, when the risk analysis system receives a request to perform a first task associated with a first domain (e.g., determining a credit worthiness of a user applying to use a first financial product, etc.), the risk analysis system may obtain data associated with the first task (e.g., application data associated with an application for the first financial product, etc.). The risk analysis system may use the data associated with the first task to generate input data for the machine learning model based on the feature arrangement. For example, the risk analysis system may organize the data according to the feature arrangement. Specifically, the risk analysis system may extract a first portion of the data corresponding to the common features, and may insert it in the domain independent section of the input data. The risk analysis system may also insert the data in a domain-specific section of the input data that corresponds to the first domain. Similar to preparing the training data, the risk analysis system may insert placeholder values (or leave blank) the other domain-specific sections of the input data. The risk analysis system may then provide the input data to the machine learning model, and may obtain an outcome from the machine learning model. In some embodiments, the risk analysis system may perform an action (e.g., process the application for the first financial product, etc.) based on the outcome.

FIG. 1 illustrates an electronic transaction system 100, within which the risk analysis system may be implemented according to one embodiment of the disclosure. The electronic transaction system 100 includes service provider servers 130, 180, and 190, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider servers 130, 180, and/or 190. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120 and/or the service provider server 130, and may transmit data files, such as an image, a document, etc. to the merchant server 120 and/or the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider servers 130, 180, and/or 190 via the network 160, and the identifier 114 may be used by the service provider servers 130, 180, and/or 190 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to add a new funding account, to perform an electronic purchase with a merchant associated with the merchant server 120, to provide information associated with the new funding account, to initiate an electronic payment transaction with the service provider servers 130, 180, and/or 190, to apply for a financial product through the service provider servers 130, 180, and/or 190, to access data associated with the service provider servers 130, 180, and/or 190, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal©, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130. In some embodiments, in order to process certain types of transactions for a user (e.g., the user 140, a merchant associated with the merchant server 120, etc.), the service provider server 130 may request the user 140 to submit one or more documents (e.g., a driver's license, a merchant agreement, etc.) via an interface presented on a device (e.g., the user device 110, the merchant server 120, etc.). The user may then transmit one or more images of the documents to the service provider server 130 (e.g., uploading images of documents to the service provider server via a user interface provided on the user device 110).

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

Each of the service provider servers 180 and 190 may include similar components of the service provider server 130 as discussed above for providing services to users and/or merchants, and for enabling the users and merchants to initiate transactions with the service provider servers 180 and 190. In some embodiments, each of the service provider servers 130, 180, and 190 may be configured to use a machine learning model to perform a specific task related to the services provided to the users and the merchants (e.g., a respective domain). For example, each of the service provider servers 130, 180, and 190 may be configured to use a respective machine learning model to predict a risk associated with a transaction (e.g., a login transaction, a payment transaction, a transaction for applying for a financial product, etc.) associated with its respective domain. In some embodiments, each of the service provider servers 130, 180, and 190 may identify respective features that are relevant for performing the respective tasks. A machine learning model associated with a particular domain may be configured to use data values corresponding to the features to perform the task associated with the particular domain.

In some cases, the features associated with the different domains may be identical while in other cases, the features associated with the different domains maybe different. For example, when the tasks include determining a risk of login transaction requests, the features for determining a risk of login transaction requests may include a time of day, a location of the device used to initiate the login transaction, an Internet Protocol (IP) address of the device, a time of the previous login attempt, a result of the previous login attempt, etc. As such, the features for determining such risk may be the same across the different domains (e.g., the different websites, etc.). On the other hand, the tasks may include determining a credit worthiness associated with a user applying for different financial products. The features for determining a credit worthiness associated with a user applying for a particular financial product may include product independent features such as an age, a gender, a credit history, a frequency in change of home addresses, a previous login time, etc. as well as product dependent features such as the unique characteristics associated with the particular financial product, characteristics of any services linked to the particular financial products, historical applications for the corresponding financial product, historical behavior with the linked services, etc. As such, the features for determining such credit worthiness may be different, dependent on the characteristics of the financial products.

Each of the service provider servers 130, 180, and 190 may configure a respective machine learning model to accept data values corresponding to the respective features to perform the respective task. The machine learning models may be trained using training data associated their respective domains. As discussed herein, the tasks that are being performed by the respective machine learning models associated with the service provider servers 130, 180, and 190 may be related to one another. For example, the tasks may include determining a credit worthiness of users applying to use various financial products associated with the service provider servers 130, 180, and 190. In another example, the tasks may include determining a risk of requests for performing transactions (e.g., payment transactions) with the service provider servers 130, 180, and 190. When the tasks are related to one another, it may be beneficial to provide transfer learning to the machine learning models across the different domains, such that each machine learning model may learn knowledge derived from not only training data associated with the corresponding domain, but also from training data associated with other related domains. Transfer learning techniques are intended to improve the accuracy performance of the machine learning models based on the derived knowledge across multiple related domains.

As such, in various embodiments, the service provider server 130 (or any other one of the service provider servers 180 and 190) also includes a risk analysis module 132 that implements the risk analysis system as discussed herein. The risk analysis module 132 may be configured to facilitate transfer learning across the multiple domains associated with the service provider server 130, 180, and 190 even when the multiple domains do not share an identical feature set. In some embodiments, the risk analysis module 132 may analyze the features associated with the different domains. The risk analysis module 132 may determine features that are common across the different domains and features that are not shared by the different domains. The risk analysis module 132 may then determine a feature arrangement that include all of the features associated with the different domains. The risk analysis module 132 may generate a machine learning model that can perform the tasks associated with the different domains using the feature arrangement. The machine learning model can be implemented in many different ways. For example, the machine learning model may be implemented as an artificial neural network, a gradient boosting tree, a regression model, or any other type of learning model. The risk analysis module 132 may configure the machine learning model to accept input values corresponding to input features based on the feature arrangement. The risk analysis module 132 may train the machine learning model using training data associated with the different domains such that the machine learning model may learn knowledge that is derived from the different domains. Such a machine learning model may perform any one of the tasks associated with the different domains with better accuracy performance than machine learning models that are configured and trained specifically for any one specific domain and machine learning models that have undergone a conventional transfer learning process (e.g., using only common features).

Figure 2:
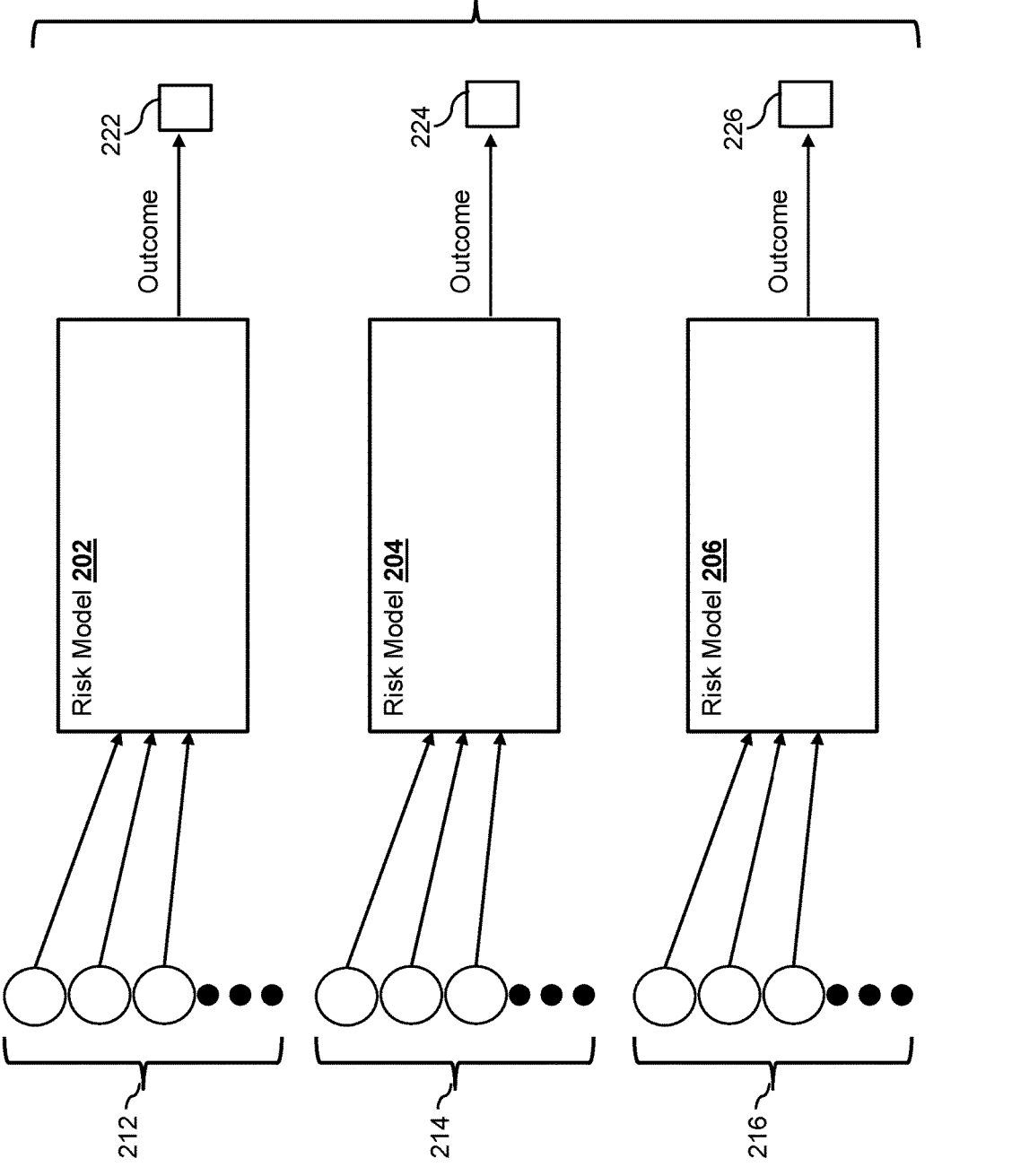
FIG. 2 illustrates different input features of machine learning models associated with different domains according to an embodiment of the present disclosure.

FIG. 2 illustrates example risk models 202, 204, and 206 that may be used by the service provider servers 130, 180, and 190, respectively, to perform respective tasks associated with the different domains. As shown, each of the risk models 202, 204, and 206 may be configured to receive input values corresponding to the respective features, and use the received input values to produce the respective outcomes. For example, the risk model 202 may be configured to receive input values corresponding to a set of features 212, and use the input values to produce an outcome 222. The risk model 204 may be configured to receive input values corresponding to a set of features 214, and use the input values to produce an outcome 224. The risk model 206 may be configured to receive input values corresponding to a set of features 216, and use the input values to produce an outcome 226. The sets of features 212, 214, and 216 associated with the risk models 202, 204, and 206, and the outcomes 222, 224, and 226 produced by the risk models 202, 204, and 206 may be dependent on the tasks being performed by the risk models 202, 204, and 206. For example, when the risk models 202, 204, and 206 are configured to predict a risk of login transaction requests for different websites (e.g., websites associated with the service provider servers 130, 180, and 190), the sets of features 212, 214, and 216 may be related to attributes that are relevant to predicting the risk of login transaction requests, which may include a time of day of the login transaction request, a time of day of a previous login transaction request, device attributes of a device that initiated the login transaction request, etc. The outcomes 222, 224, and 226 may indicate a likelihood that a login transaction request is a fraudulent request (e.g., a percentage, etc.).

On the other hand, if the risk models 202, 204, and 206 are configured to determine a credit worthiness of applicants who are applying to use different financial products, the sets of features 212, 214, and 216 may be related to attributes of the applicants and the applications' previous interactions with the service provider servers 130, 180, and 190, and other related services. The outcomes 222, 224, and 226 may indicate a credit worthiness of the applicants (e.g., a credit score, etc.). Based on the different characteristics of the different websites and/or the different financial products, the sets of features 212, 214, and 216 may or may not be identical. In some cases, due to the similarities of the tasks (e.g., predicting a risk of login transactions of websites, determining credit worthiness of applications for the financial products, etc.), the sets of features 212, 214, and 216 may share one or more common features. However, due to the differences among the tasks, each set of features may include features that are not shared by the remaining sets of features.

Figure 3:
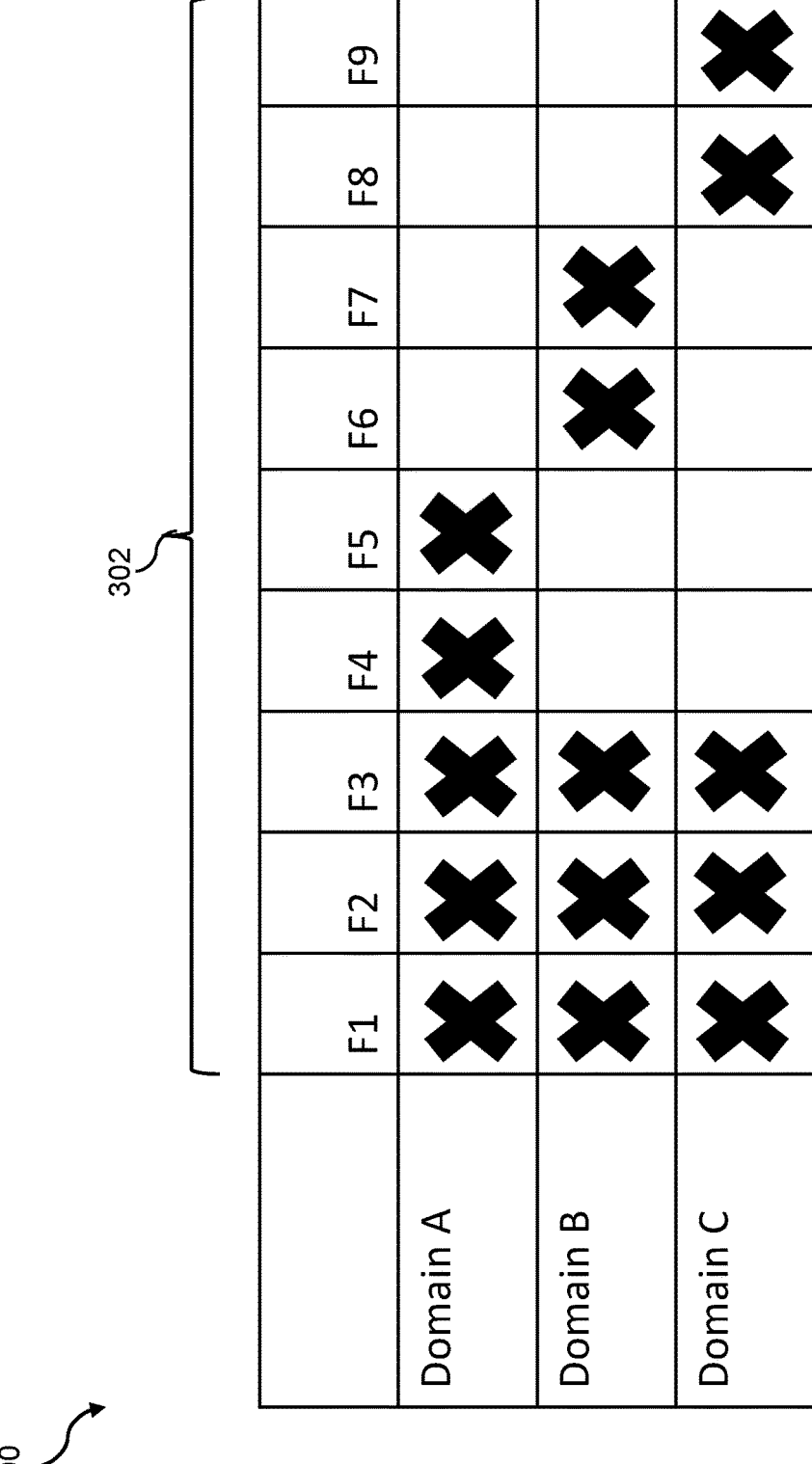
FIG. 3 illustrates example input features associated with different domains according to an embodiment of the present disclosure.

FIG. 3 illustrates a table 300 containing example sets of features associated with different domains according to various embodiments of the disclosure. Specifically, the table 300 includes a superset of features 302 that includes all of the features associated with the risk model 202 (Domain 'A'), the risk model 204 (Domain 'B'), and the risk model 206 (Domain 'C'). For purposes of illustrating the inventive concepts, only nine features are included in the superset. However, the superset of features 302 may include any number of features without departing from the spirit of the disclosure, as long as the superset 302 includes all of the features from the different related domains. In this example, the superset of features 302 includes features 'F1,' 'F2,' 'F3,' 'F4,' 'F5,' 'F6,' 'F7,' 'F8,' and 'F9.' Each of the domains (Domain 'A,' Domain 'B,' and Domain 'C') may include at least some of the features in this superset 302. For example, Domain 'A,' which is associated with the risk model 202, includes features 'F1,' 'F2,' 'F3,' 'F4,' and 'F5.' Domain 'B,' which is associated with the risk model 204, includes features 'F1,' 'F2,' 'F3,' 'F6,' and 'F7.' Domain 'C,' which is associated with the risk model 206, includes features 'F1,' 'F2,' 'F3,' 'F8,' and 'F9.'

The risk analysis module 132 may then determine a feature arrangement based on the features associated with the different domains. As discussed herein, the feature arrangement may include a domain independent section and multiple domain-specific sections. The domain independent section may include features that are common among the multiple domains. In this example, the domain independent section may include features 'F1,' 'F2,' and 'F3,' which are common among Domain 'A,' Domain 'B,' and Domain 'C.' Since the risk analysis module 132 facilitates transfer learning across three different domains in this example, the risk analysis module 132 may determine three domain-specific sections for the feature arrangement. Each of the domain-specific sections may correspond to a particular domain and may include features associated with the particular domain. For example, the feature arrangement may include a first domain-specific section corresponding to Domain 'A,' and including features that are associated with Domain 'A,' including features 'F1,' 'F2,' 'F3,' 'F4,' and 'F5.' The feature arrangement may also include a second domain-specific section corresponding to Domain 'B,' and including features that are associated with Domain 'B,' including features 'F1,' 'F2,' 'F3,' 'F6,' and 'F7.' The feature arrangement may also include a third domain-specific section corresponding to Domain 'C,' and including features that are associated with Domain 'C,' including features 'F1,' 'F2,' 'F3,' 'F8,' and 'F9.' As such, the feature arrangement includes the common features 'F1,' 'F2,' and 'F3' four times—one in the domain independent section and one in each of the domain-specific sections.

Figure 4:
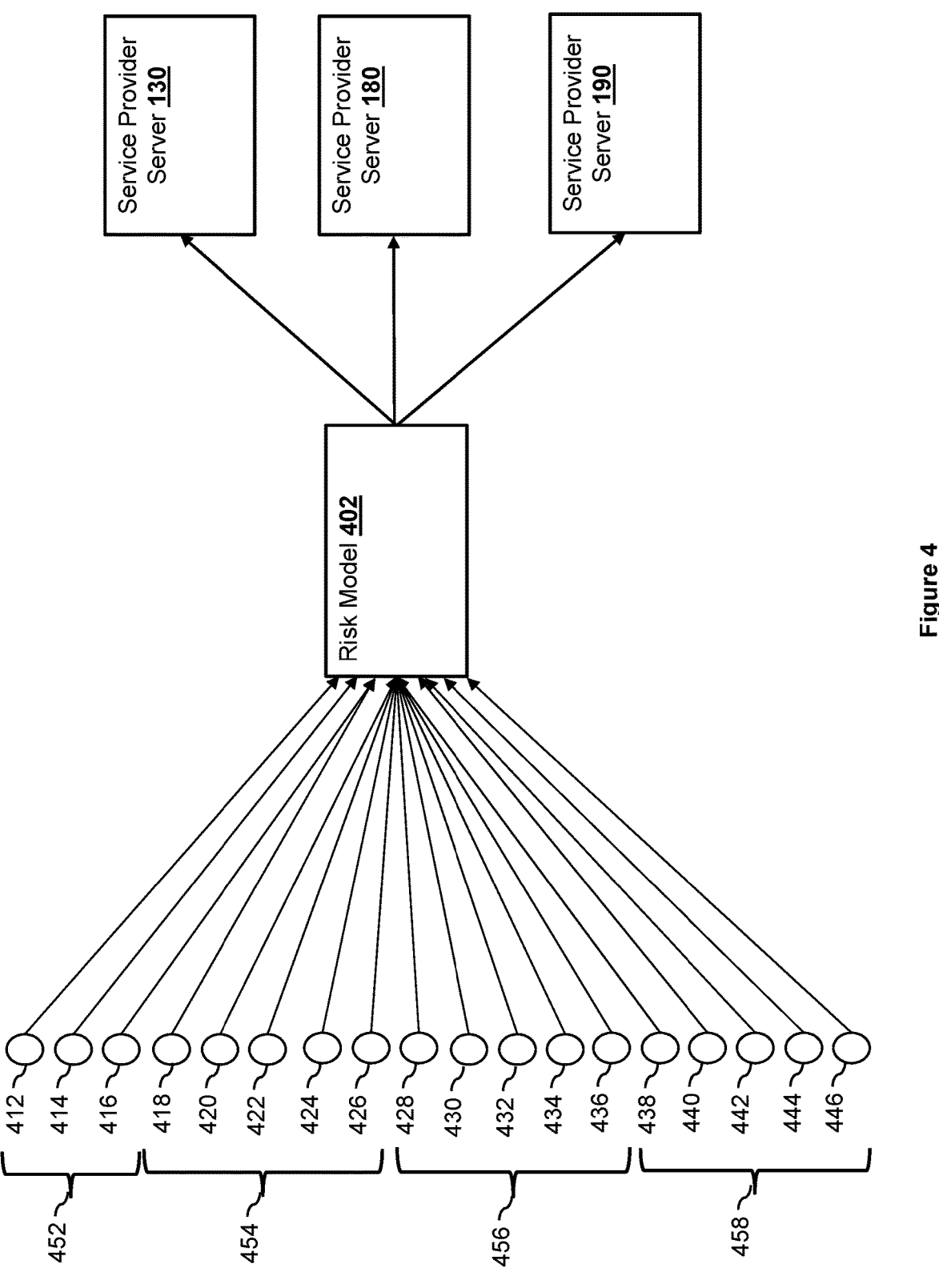
FIG. 4 illustrates a set of input features of a machine learning model that is configured to facilitate transfer learning according to an embodiment of the present disclosure.

The risk analysis module 132 may configure a machine learning model based on the feature arrangement determined for the three domains. In particular, the risk analysis module 132 may configure the machine learning model to accept input values corresponding to input features according to the feature arrangement. FIG. 4 illustrates a risk model 402 that is configured by the risk analysis module 132 based on the feature arrangement according to various embodiments of the disclosure. As such, the risk model 402 is configured to accept input values corresponding to a set of input features 412, 414, 416, 418, 420, 422, 424, 426, 428, 430, 432, 434, 436, 438, 440, 442, 444, and 446 according to the feature arrangement determined for the three domains. Specifically, the set of input features associated with the risk model 402 includes a subset of input features 452 corresponding to the domain independent section of the feature arrangement, a subset of input features 454 corresponding to the first domain-specific section of the feature arrangement, a subset of input features 456 corresponding to the second domain-specific section of the feature arrangement, and a subset of input features 458 corresponding to the third domain-specific section of the feature arrangement.

As such, the input features 412, 414, and 416 in the subset of features 452 correspond to the common features 'F1,' 'F2,' and F3,' respectively. The input features 418, 420, 422, 424, and 426 in the subset of features 454 correspond to the features 'F1,' 'F2,' 'F3,' 'F4,' and 'F5' (associated with Domain 'A'), respectively. The input features 428, 430, 432, 434, and 436 in the subset of features 456 correspond to the features 'F1,' 'F2,' 'F3,' 'F6,' and 'F7' (associated with Domain 'B'), respectively. The input features 438, 440, 442, 444, and 446 in the subset of features 458 correspond to the features 'F1,' 'F2,' 'F3,' 'F8,' and 'F9' (associated with Domain 'C'), respectively. As discussed herein, the risk model 402 that is configured in this manner may perform any one of the tasks associated with the three domains. Specifically, based on the set of input features 412-446, that includes all of the features associated with the three domains, the risk model 402 may accept input values corresponding to any one of the feature sets 212, 214, and 216 associated with the risk models 202, 204, and 206, to perform the respective tasks. Furthermore, by having the subset of features 452 corresponding to the common features 'F1,' 'F2,' and 'F3,' in addition to the other subsets of features 454, 456, and 458 corresponding to the three domains, the risk model 402 may include machine learning structure, such as nodes and connections among the nodes within an artificial neural network, for separately analyzing (a) the common features 'F1,' 'F2,' and 'F3' as the way they affect the different tasks associated with the three domain universally (based on the input features 412, 414, and 416), (b) the common features 'F1,' 'F2,' and 'F3' as the way they affect the task associated with each particular domain specifically (based on the input features 418, 420, 422, 428, 430, 432, 438, 440, and 442), and (c) the non-common features F4,' 'F5,' 'F6,' 'F7,' 'F8,' and 'F9' as the way they affect the tasks associated with the three domain specifically (based on the input features 424, 426, 434, 436, 444, and 446). Thus, the risk model 402 may replace the risk models 202, 204, and 206 with the risk model 402 to perform the tasks associated with the three domains for the service provider servers 130, 180, and 190.

Before using the risk model 402 to perform the tasks for the service provider servers 130, 180, and 190, the risk analysis module 132 may train the risk model 402 using training data. However, since the input features 412-446 associated with the risk model 402 include different features, and are arranged in a different format, than the training data associated with any one of the domains, the risk analysis module 132 may prepare training data that is specifically for the risk model 402. In some embodiments, the risk analysis module 132 may generate the training data for the risk model 402 using the training data associated with the different domains based on the feature arrangement. For example, the risk analysis module 132 may generate a data structure for storing the training data for the risk model 402 based on the feature arrangement.

Figure 5:
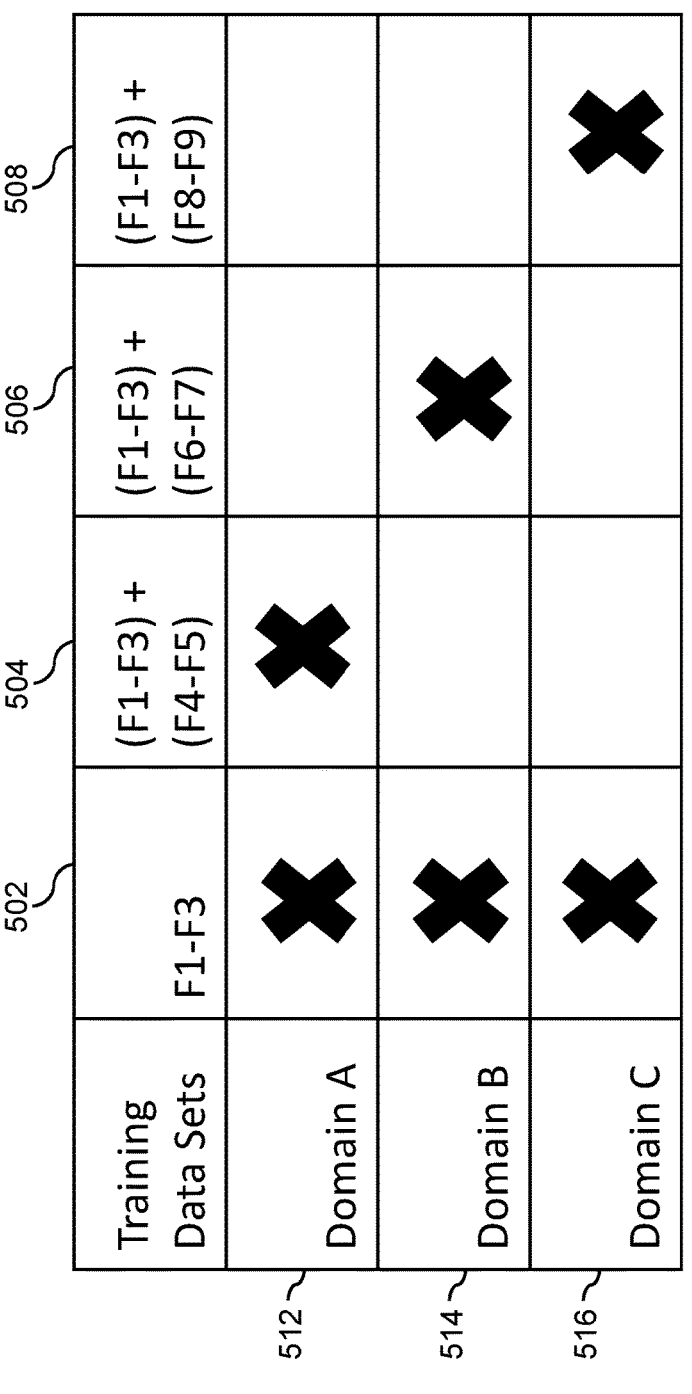
FIG. 5 illustrates an example feature arrangement for configuring and training a machine learning model according to an embodiment of the present disclosure.

FIG. 5 illustrates an example data structure 500 for storing training data according to various embodiments of the disclosure. Following the feature arrangement determined for the risk analysis module 132, the risk analysis module 132 may include, in the data structure, a domain independent section 502 and multiple domain-specific sections 504, 506, and 508. The domain independent section 502 may include a first set of columns corresponding to the set of common features 'F1,' 'F2,' and 'F3.' Each of the multiple domain-specific sections 504, 506, and 508 may include a set of columns corresponding to features associated with the respective domains. For example, the domain-specific section 504 may include the features associated with Domain 'A,' including the common features 'F1,' 'F2,' and 'F3' and other features associated with the Domain 'A' but not included in the common features, such as the features 'F4' and 'F5'. The domain-specific section 506 may include the features associated with Domain 'B,' including the common features 'F1,' 'F2,' and 'F3' and other features associated with the Domain 'B' but not included in the common features, such as the features 'F6' and 'F7'. The domain-specific section 508 may include the features associated with Domain 'C,' including the common features 'F1,' 'F2,' and 'F3' and other features associated with the Domain 'C' but not included in the common features, such as the features 'F8' and 'F9'.

The risk analysis module 132 may then determine the training data for the risk model 402 using the training data associated with the different domains. For example, for each training data associated with a particular domain, the risk analysis module 132 may extract the portion of the training data corresponding to the common features 'F1,' 'F2,' and 'F3,' and may insert the portion of the training data into the domain independent section 502 of a new training data record in the data structure 500. The risk analysis module 132 may also identify, among the multiple domain-specific sections 504, 506, and 508 in the data structure 500, a particular domain-specific section corresponding to the particular domain associated with the training data. The risk analysis module 132 may then insert the entire training data (which includes the portion of the training data corresponding to the common features and the remaining portion of the training data) into the particular domain-specific section of the new training data record. In some embodiments, the risk analysis module 132 may leave blank (or insert default values into) the other domain-specific sections of the new training data record.

For example, when the training data obtained by the risk analysis module 132 is associated with the risk model 202 (Domain 'A'), the risk analysis module 132 may generate a new training data record (e.g., a record 512) within the data structure 500, and may insert data into the training data record 512. The risk analysis module 132 may extract a portion of the training data corresponding to the common features 'F1,' 'F2,' and 'F3,' and may insert the portion of the training data into the domain independent section 502 of the training data record 512. In this example, since the training data is associated with Domain 'A,' the risk analysis module 132 may also insert the entire training data into the domain-specific section 504 corresponding to Domain 'A.' The risk analysis module 132 may also leave blank (or insert default values such as null) into the other domain-specific sections 506 and 508 of the training data record 512.

Similarly, when the training data obtained by the risk analysis module 132 is associated with the risk model 204 (Domain 'B'), the risk analysis module 132 may generate a new training data record (e.g., a record 514) within the data structure 500, and may insert data into the training data record 514. The risk analysis module 132 may extract a portion of the training data corresponding to the common features 'F1,' 'F2,' and 'F3,' and may insert the portion of the training data into the domain independent section 502 of the training data record 514. In this example, since the training data is associated with Domain 'B,' the risk analysis module 132 may also insert the entire training data into the domain-specific section 506 corresponding to Domain 'B.' The risk analysis module 132 may also leave blank (or insert default values such as null) into the other domain-specific sections 504 and 508 of the training data record 514.

When the training data obtained by the risk analysis module 132 is associated with the risk model 206 (Domain 'C'), the risk analysis module 132 may generate a new training data record (e.g., a record 516) within the data structure 500, and may insert data into the training data record 516. The risk analysis module 132 may extract a portion of the training data corresponding to the common features 'F1,' 'F2,' and 'F3,' and may insert the portion of the training data into the domain independent section 502 of the training data record 516. In this example, since the training data is associated with Domain 'C,' the risk analysis module 132 may also insert the entire training data into the domain-specific section 508 corresponding to Domain 'C.' The risk analysis module 132 may also leave blank (or insert default values such as null) into the other domain-specific sections 504 and 506 of the training data record 516. Using the process described herein, the risk analysis module 132 may continue to generate training data records for the risk model 402 based on the data structure 500 using various data associated with the different domains.

The risk analysis module 132 may then use the training data records stored in the data structure 500 to train the risk model 402. The training of the risk model 402 using training data associated with the different domains enables the risk model 402 to learn patterns and other knowledge derived from the training data across the multiple domains. Specifically, using the training data record 512 to train the risk model 402, the risk model 402 may learn how input values corresponding to the domain independent section 502, and how input values corresponding to the domain-specific section 504 affect the outcome of the task associated with Domain 'A.' Similarly, using the training data record 514 to train the risk model 402, the risk model 402 may learn how input values corresponding to the domain independent section 502, and how input values corresponding to the domain-specific section 506 affect the outcome of the task associated with Domain 'B.' Using the training data record 516 to train the risk model 402, the risk model 402 may learn how input values corresponding to the domain independent section 502, and how input values corresponding to the domain-specific section 508 affect the outcome of the task associated with Domain 'C.' Since the input values corresponding to the domain independent section 502 are always provided to the risk model 402 independent of which task to perform, the risk model 402 may learn how the input values corresponding to the domain independent section 502 affect the outcome of the tasks associated with the different domains generally. On the other hand, since the input values corresponding to the domain-specific sections 504, 506, and 508 independent section 502 are provided to the risk model 402 only when tasks associated with the corresponding domain are performed, the risk model 402 may learn how the input values corresponding to the domain-specific sections 504, 506, and 508 affect the outcome of the tasks associated with the corresponding domains specifically. The inclusion of the common features in both the domain independent section 502 and the domain-specific sections 504, 506, and 508 ensure that the risk model 402 can learn how the common features affect the tasks associated with the different domains universally, and how the common features affect the tasks associated with the corresponding domains specifically, such that transfer learning across the multiple domains is facilitated without sacrificing the risk model 402's ability to perform tasks associated with individual domains.

The risk model 402 may be used to perform the tasks associated with Domain 'A,' Domain 'B,' and/or Domain 'C' after training. When a request for performing a task associated with a particular domain is received, the risk model 402 may use data associated with the request to generate a set of input values according to the data structure 500. For example, the risk analysis module 132 may obtain a portion of the data corresponding to the common features 'F1,' 'F2,' and 'F3' and insert in the domain independent section 502 of a new input data record. The risk analysis module 132 may also insert the entire data into a corresponding domain-specific section 504, 506, or 508. The risk analysis module 132 may also fill in the remaining domain-specific sections with blank or default values. After preparing the set of input values for the risk model 402, the risk analysis module 132 may provide the set of input values to the risk model 402 and obtain an outcome from the risk model 402. In some embodiments, the risk analysis module 132 may perform an action based on the outcome, and/or transmit the outcome to another module (e.g., the service application 138), such that the other module may perform an action based on the outcome. For example, if the task is associated with predicting a risk of a login transaction of a website, the outcome may include a value that indicates the risk. Thus, the risk analysis module 132 and/or the service application 138 may perform an action (e.g., authorize a user to login to the website or deny the user from logging in to the website, etc.) based on the outcome. In another example, if the task is associated with determining a credit worthiness of a user for applying for a financial product, the outcome may include a value that indicates a credit score of the user. The risk analysis module 132 and/or the service application 138 may then accept the user's application or deny the user's application based on the outcome.

Figure 6:
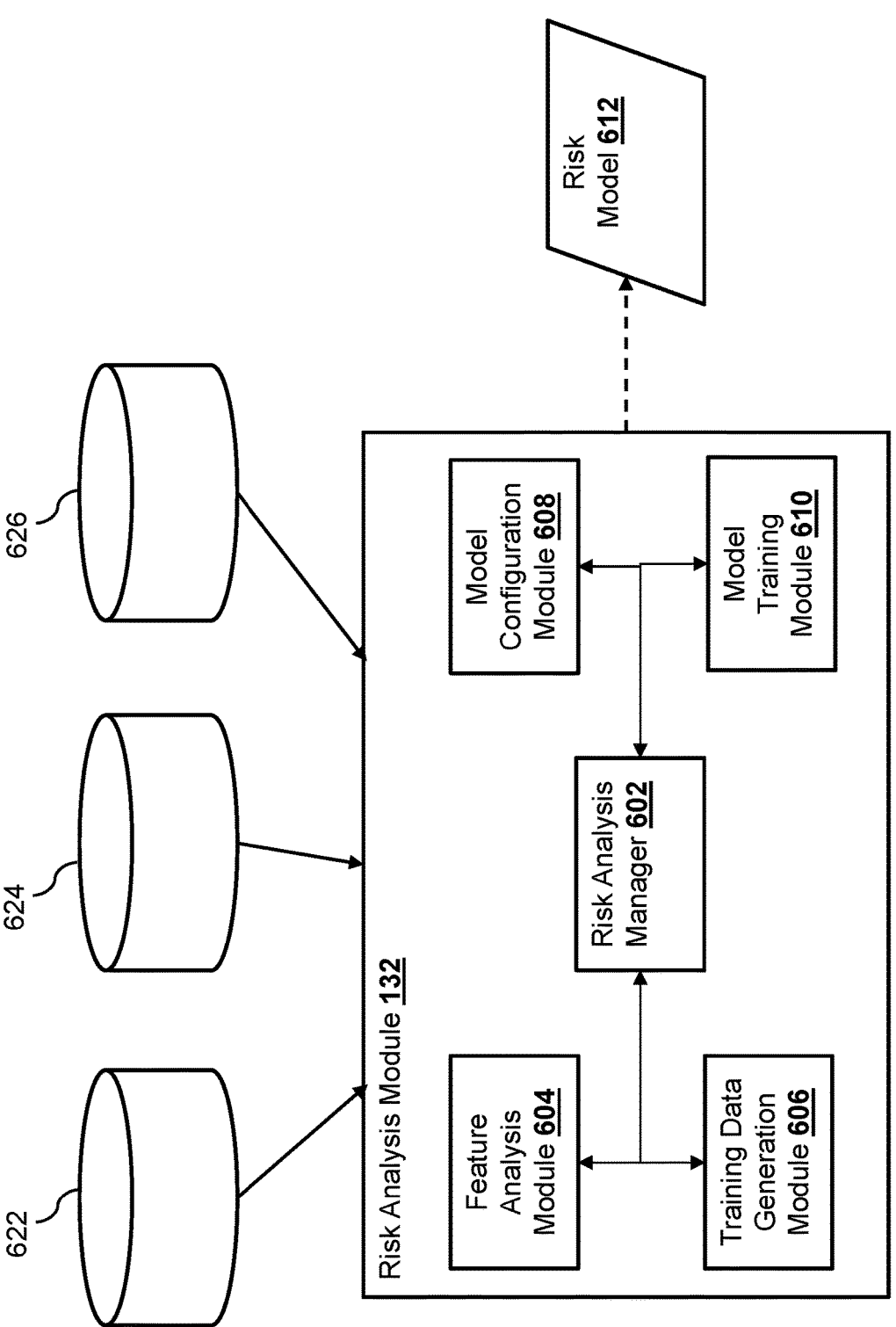
FIG. 6 is a block diagram illustrating a risk analysis module according to an embodiment of the present disclosure.

FIG. 6 illustrates a block diagram of the risk analysis module 132 according to an embodiment of the disclosure. The risk analysis module 132 includes a risk analysis manager 602, a feature analysis module 604, a training data generation module 606, a model configuration module 608, and a model training module 610. As discussed herein, the service provider servers 130, 180, and 190 may provide a user interface (e.g., through the interface server 134) on a device of a user (e.g., the user device 110, the merchant server 120, etc.). The user may transmit a transaction request (e.g., a login request for logging in to a website, a request for performing a payment transaction, an application for a financial product, etc.) to any one of the service provider servers 130, 180, and 190 via the user interface. Each of the service provider servers 130, 180, and 190 may be configured to process the transaction request. In some embodiments, in order for the service provider server to process certain types of transaction, the service provider server may request a task to be performed by a risk model. The task may be associated with predicting a risk associated with a transaction (e.g., a login transaction, a payment transaction), determining a credit worthiness of a user for applying for a financial product, or other types of tasks.

Since the tasks associated with the service provider servers 130, 180, and 190 may be related to each other, instead of using different risk models (e.g., risk models 202, 204, and 206) to perform the different tasks for the different service provider servers 130, 180, and 190 (e.g., different domains), the risk analysis manager 602 may generate a risk model 612 that is capable of performing any of the tasks associated with the service provider servers 130, 180, and 190. Furthermore, the risk analysis manager 602 may also facilitate, on the risk model 612, transfer learning across the different domains associated on the service provider servers 130, 180, and 190.

To generate and configure the risk model 612, the risk analysis manager 602 may use the feature analysis module 604 to select input features for the risk model 612. In some embodiments, the feature analysis module 604 may access data associated with the service provider servers 130, 180, 190. For example, the feature analysis module 604 may access data stored in data storages 622, 624, and 626, which are associated with the service provider servers 130, 180, and 190, respectively. The data stored in the data storages 622, 624, and 626 may include training data used to train the separate risk models 202, 204, and 206 and/or transaction data associated with the service provider servers 130, 180, and 190. The feature analysis module 604 may analyze the data stored in the data storages 622, 624, and 626 to determine sets of features associated with the tasks performed by the risk models 202, 204, and 206. The feature analysis module may determine common features that are common for the tasks performed by the risk models 202, 204, and 206. The feature analysis module 604 may then determine a feature arrangement for the risk model 612 based on the sets of features associated with the tasks performed by the risk models 202, 204, and 206, and the common features. For example, the feature analysis module 604 may determine the feature arrangement in a format similar to the format of the data structure 500.

The model configuration module 608 may configure the input features of the risk model 612 based on the feature arrangement such that the risk model 612 is configured to receive input values corresponding to the feature arrangement. Since the input feature associated with the risk model 612 is not compatible with any of the training data associated with the service provider servers 130, 180, and 190, the training data generation module 606 may generate training data specifically for the risk model 612. In some embodiments, the training data generation module 606 may generate a data structure such as the data structure 500 based on the feature arrangement. The training data generation module 606 may generate new training data records in the data structure using the training data stored in the data storages 622, 624, and 626. Each training data record in the data structure may include data extracted from the data storages 622, 624, and 626, and formatted according to the feature arrangement.

The model training module 610 may then train the risk model 612 using the training data records from the data structure. After training the risk model 612, the risk analysis manager 602 may use the risk model 612 to perform the different tasks associated with the service provider servers 130, 180, and 190.

The above examples described generating a consolidated machine learning model for replacing multiple existing machine learning models configured to perform related tasks. The consolidated machine learning model can be trained to learn knowledge derived from training data associated with the different tasks of different domains, and then use the learned knowledge from the different domains to perform the various tasks. In some embodiments, instead of replacing the existing machine learning models associated with different domains, the risk analysis module 132 may configure a first machine learning model to perform a first task associated with a first domain based on knowledge from a second domain. Consider an example where a new product (e.g., a new online service, a new financial product, etc.) is introduced by an organization. The first task may be associated with predicting a risk of a transaction in association with the new product, determining a credit worthiness of a user applying for the new product, or other types of tasks. Since there has not been any transactions conducted in association with the new product, no existing training data is available for training the first machine learning model to perform the first task. However, the risk analysis module 132 may determine that the new product is related to an existing product. For example, the existing product may be provided to a particular territory only, and the new product is introduced for users in a new territory. In another example, the existing product may be provided for a particular demographic, and the new product is introduced for users associated with another demographic. The organization may already have training data available and usable for training a second machine learning model configured to perform a second task associated with the existing product (a second domain). While the new product may be related to the existing product, the new product may have different attributes than the new product. Thus, one or more features usable to perform the first task may not be included in the feature set for performing the second task.

The organization may use the second machine learning model to perform the first task. Doing so may leverage the knowledge associated with the second domain to perform the first task. However, a drawback of this approach is that the second machine learning model may not be able to learn how the features specifically associated with the first task, and not associated with the second task, can be used to perform the first task, since these features are not available for the second machine learning model.

Thus, in some embodiments, the risk analysis module 132 may use the same technique disclosed herein to facilitate transfer learning in the first machine learning model. For example, the risk analysis module 132 may determine a feature arrangement based on the set of features associated with the first task and the set of features associated with the second task. The feature arrangement may include a domain independent section that includes common features found in both sets of features associated with the first and second tasks. The feature arrangement may also include two domain-specific sections. Each domain-specific section may include features associated with a corresponding task. The risk analysis module 132 may configure the input features of the first machine learning model according to the feature arrangement, such that the first machine learning model may accept and evaluate all features associated with the first task and the second task.

The risk analysis module 132 may generate training data for the machine learning model according to the feature arrangement using the training data associated with the second task. While there is no available data specifically for the domain-specific section corresponding to the first task, the machine learning model can still learn how the common features affect the outcomes of the first and second tasks in general based on the portion of the training data in the domain independent section. The machine learning model may be used to perform the first task. While the machine learning model was not trained with any training data associated with the first task at this point, the machine learning model's performance should be similar to the performance of the second machine learning model, and better than models that are not trained with any training data at all.

As transactions associated with the first task are conducted, and transaction data associated with the first task becomes available to the risk analysis module 132. The risk analysis module 132 may generate new training data according to the feature arrangement based on the transaction data associated with the first task, and re-train the machine learning model using the new training data. Based on the re-training, the machine learning model may learn knowledge associated with both the first task and the second task. Specifically, the machine learning model may learn how the common features and also the features that are specific to the first task affect the performance of the first task. Thus, as more transaction data and training data associated with the first task is used to train the first machine learning model, the performance of the first machine learning model will continue to improve, and exceed that of the second machine learning model.

FIG. 7 illustrates an example artificial neural network 700 that may be used to implement any machine learning models (e.g., risk models 402 and 612, etc.). As shown, the artificial neural network 700 includes three layers—an input layer 702, a hidden layer 704, and an output layer 706. Each of the layers 702, 704, and 706 may include one or more nodes. For example, the input layer 702 includes nodes 732, 734, 736, 738, 740, and 742, the hidden layer 704 includes nodes 744, 746, and 748, and the output layer 706 includes a node 750. In this example, each node in a layer is connected to every node in an adjacent layer. For example, the node 732 in the input layer 702 is connected to all of the nodes 744, 746, and 748 in the hidden layer 704. Similarly, the node 744 in the hidden layer is connected to all of the nodes 732, 734, 736, 738, 740, and 742 in the input layer 702 and the node 750 in the output layer 706. Although only one hidden layer is shown for the artificial neural network 700, it has been contemplated that the artificial neural network 700 used to implement any one of the computer-based models, 402 and 612, etc., may include as many hidden layers as necessary.

In this example, the artificial neural network 700 receives a set of inputs and produces an output. Each node in the input layer 702 may correspond to a distinct input. For example, when the artificial neural network 700 is used to implement a machine learning model 402 and/or 612, each node in the input layer 702 may correspond to a distinct feature in the determined feature arrangement according to the data structure 500. As such, the input layer may include a set of nodes corresponding to a domain independent section of the feature arrangement and multiple sets of nodes corresponding to different domain-specific sections of different domains.

In some embodiments, each of the nodes 744, 746, and 748 in the hidden layer 704 generates a representation, which may include a mathematical computation (or algorithm) that produces a value based on the input values received from the nodes 732, 734, 736, 738, 740, and 742. The mathematical computation may include assigning different weights (e.g., node weights, etc.) to each of the data values received from the nodes 732, 734, 736, 738, 740, and 742. The nodes 744, 746, and 748 may include different algorithms and/or different weights assigned to the data variables from the nodes 732, 734, 736, 738, 740, and 742 such that each of the nodes 744, 746, and 748 may produce a different value based on the same input values received from the nodes 732, 734, 736, 738, 740, and 742. In some embodiments, the weights that are initially assigned to the features (or input values) for each of the nodes 744, 746, and 748 may be randomly generated (e.g., using a computer randomizer). The values generated by the nodes 744, 746, and 748 may be used by the node 750 in the output layer 706 to produce an output value for the artificial neural network 700. When the artificial neural network 700 is used to implement a machine learning model configured to determine a risk of a transaction request, the output value produced by the artificial neural network 700 may indicate a risk (e.g., a risk score). When the artificial neural network 700 is used to implement a machine learning model configured to determine a credit worthiness of a user, the output value produced by the artificial neural network 700 may indicate a credit worthiness of the user (e.g., a credit score).

The artificial neural network 700 may be trained by using training data. By providing training data to the artificial neural network 700, the nodes 744, 746, and 748 in the hidden layer 704 may be trained (adjusted) such that an optimal output (e.g., an entity) is produced in the output layer 706 based on the training data. By continuously providing different sets of training data, and penalizing the artificial neural network 700 when the output of the artificial neural network 700 is incorrect (e.g., when the determined document type is inconsistent with the labeled document type of the document, etc.), the artificial neural network 700 (and specifically, the representations of the nodes in the hidden layer 704) may be trained (adjusted) to improve its performance in name entity recognition. Adjusting the artificial neural network 700 may include adjusting the weights associated with each node in the hidden layer 704.

FIG. 8A illustrates a process 800 for configuring and training a machine learning model for facilitating transfer learning according to various embodiments of the disclosure. In some embodiments, at least a portion of the process 800 may be performed by the risk analysis module 132. The process 800 begins by determining (at step 805) feature sets associated with multiple domains. For example, the feature analysis module 604 may obtain data from data storages 622, 624, and 626, that are associated with different domains, respectively. The data obtained from the data storages 622, 624, and 626 may include training data usable for training different risk models 202, 204, and 206 associated with the different domains, respectively. The feature analysis module 604 may analyze the data to determine sets of features associated with the different domains.

The process 800 then determines (at step 810) a set of common features from the feature sets and generates (at step 815) a feature arrangement for configuring input features of a machine learning model and for organizing training data usable to train the machine learning model. For example, based on analyzing the different feature sets associated with the different domains, the feature analysis module 604 may determine a set of common features that is common among all of the feature sets. The feature analysis module 604 may then determine a feature arrangement based on the feature sets and the set of common features. For example, the feature arrangement may include a domain independent section comprising the set of common features. The feature arrangement may also include multiple domain-specific sections corresponding to the multiple domains. Each domain-specific section may include the feature set corresponding to a respective domain.

The model configuration module 608 may configure the input features of a new machine learning model (e.g., the risk model 612) according to the feature arrangement, such that the risk model 612 is configured to receive input values in a format corresponding to the features in the feature arrangement. Since the input features associated with the risk model 612 are incompatible with any of the features associated with the risk models 202, 204, and 206, the model training module 610 may generate training data specifically for the risk model 612. In some embodiments, the model training module 610 may generate a data structure, such as the data structure 500 for storing the training data for the risk model 612 according to the feature arrangement. The data structure 500 may include a set of columns 502 corresponding to the domain independent section 452 of the feature arrangement, and multiple sets of columns 504, 506, and 508 corresponding to the domain-specific sections 454, 456, and 458 of the feature arrangement.

The process then obtains (at step 820) data records comprising data sets associated with at least one of the multiple domains, generates (at step 825) training data sets according to the data structure based on the data sets, and trains (at step 830) the machine learning model using the training data sets. For example, the model training module 610 may generate new training data records based on the training data associated with the risk models 202, 204, and 206. The model training module 610 may first obtain training data associated with the risk models 202, 204, and 206. The model training module 610 may arrange the training data associated with the risk models 202, 204, and 206 in the data structure format of the data structure 500 to generate the new training data records. The model training module 610 may then train the risk model 612 using the training data records.

FIG. 8B illustrates a process 850 for using a machine learning model that is configured and trained based on a transfer learning technique as disclosed herein for performing a task associated with a domain according to various embodiments of the disclosure. In some embodiments, at least a portion of the process 850 may be performed by the risk analysis module 132. The process 850 begins by receiving (at step 855) a transaction request associated with one of the multiple domains. For example, one of the service provider servers (e.g., the service provider server 130) may receive a transaction request from the user device 110 via the interface server 134. The transaction request may be associated with a login transaction for logging in to a website, a payment transaction, an application for applying for a financial product, or any other types of transaction requests. The service application 138 may request the risk analysis module 132 to perform a task. The task may be associated with determining a risk associated with the login transaction request, determining a risk associated with the payment transaction request, determining a credit worthiness of a user applying for the financial product, etc.

The process 850 then determines (at step 860) transaction data associated with the transaction request and generates (at step 865) an input data set for the machine learning model according to the data structure based on the transaction data. The risk analysis manager 602 may obtain data associated with the request from the service application 138. The data obtained from the service application 138 may include data associated with a particular domain. As such, the data may not be in a format that is compatible with the risk model 612. In some embodiments, the risk analysis manager 602 may arrange the data in a format according to the feature arrangement.

The process 850 provides (at step 870) the input data set to the machine learning model and obtains (at step 875) an outcome from the machine learning model. For example, after arranging the obtained data according to a format that is compatible with the risk model 612, the risk analysis manager 602 may provide the arranged data as input values to the risk model 612 for performing the task. The risk analysis manager 602 may obtain an outcome from the risk model 612 based on performing the task. The outcome may indicate a risk of a transaction, a credit worthiness of a user, or other values related to the task. The process 850 then processes (at step 880) the transaction request based on the outcome. For example, the risk analysis manager 602 and/or the service application 138 may process the transaction request based on the outcome. The risk analysis manager 602 and/or the service application 138 may authorize or deny the transaction request based on the risk indicated by the outcome, may approve or deny the application for the financial product based on a credit worthiness indicated by the outcome, or perform any other types of actions.

In one example, the service application 138 may approve an application of a user for the financial product based on the outcome from the risk model 612. The service application 138 may then enable the user to access services associated with the financial product via the online interface provided by the interface server 134.

Figure 9:
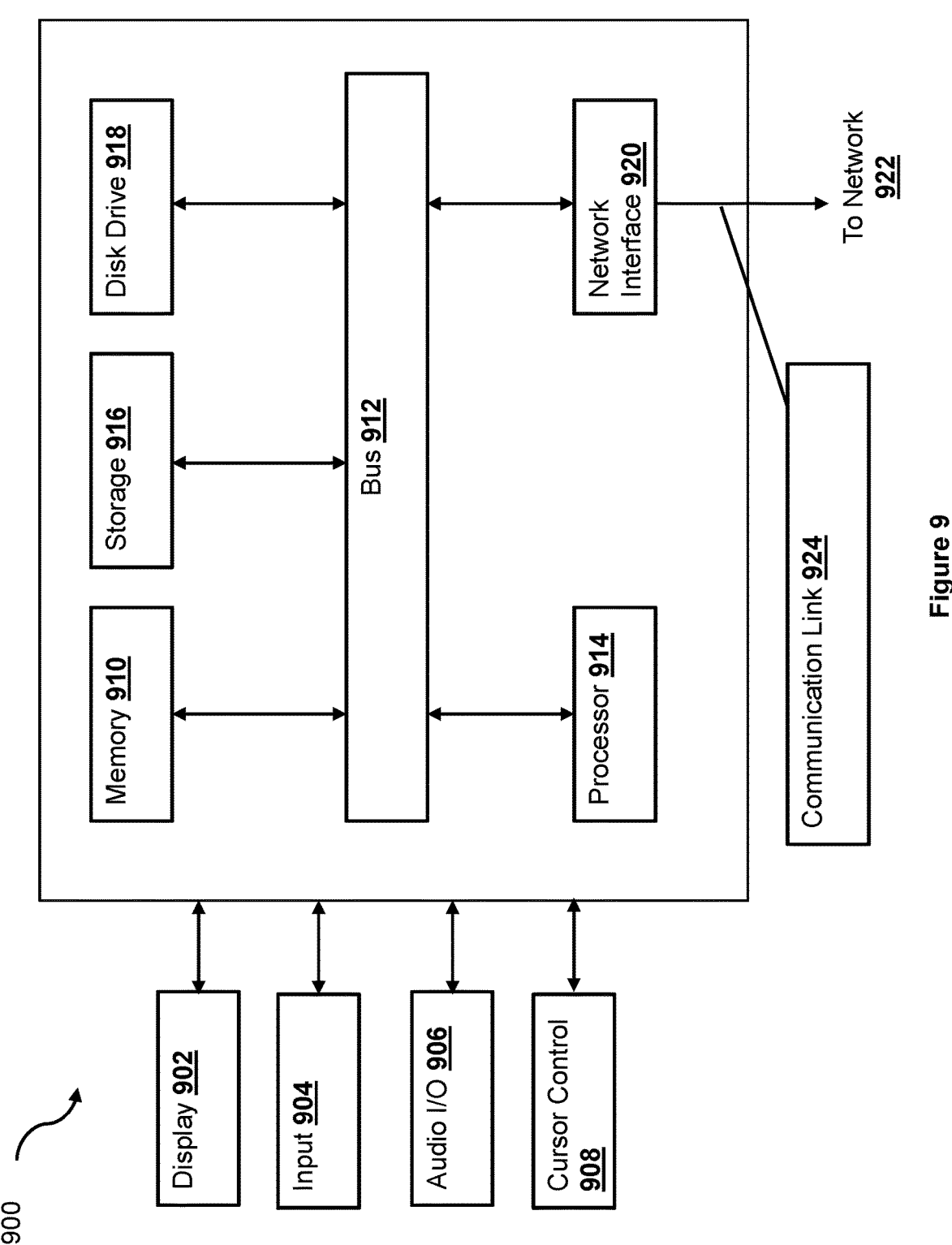
FIG. 9 is a block diagram of a system for implementing a device according to an embodiment of the present disclosure.

FIG. 9 is a block diagram of a computer system 900 suitable for implementing one or more embodiments of the present disclosure, including the service provider servers 130, 180, and 190, the merchant server 120, and the user device 110. In various implementations, the user device 110 may include a mobile cellular phone, personal computer (PC), laptop, wearable computing device, etc. adapted for wireless communication, and each of the service provider servers 130, 180, and 190, and the merchant server 120 may include a network computing device, such as a server. Thus, it should be appreciated that the devices 110, 120, 130, 180, and 190 may be implemented as the computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910. For example, the processor 914 can perform the machine learning model generation and configuration functionalities described herein, for example, according to the processes 800 and 850.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
    obtaining a first plurality of data records comprising first data associated with a first domain and corresponding to a first set of features;
    determining a set of common features between the first set of features and a second set of features associated with a second domain, wherein the set of common features is a first subset of the first set of features, and wherein each feature in a second subset of the first set of features is not common with the second set of features;
    configuring a machine learning model to perform tasks associated with the first domain and the second domain, wherein the configuring the machine learning model comprises configuring an internal structure of the machine learning model to accept and process input data corresponding to a set of input features arranged in a feature arrangement, wherein the internal structure of the machine learning model comprises (i) a first set of input nodes corresponding to a domain-independent section of the feature arrangement that includes the set of common features and having a first set of connections connecting the first set of input nodes to a first set of internal nodes of the machine learning model and (ii) a second set of input nodes corresponding to a first domain-specific section of the feature arrangement that includes the first set of features comprising both of the first subset of the first set of features and the second subset of the first set of features, wherein the second set of input nodes has a second set of connections connecting the second set of input nodes to a second set of internal nodes of the machine learning model;
    generating training data according to the feature arrangement based on the first data;
    training the machine learning model using the training data; and
    subsequent to the training the machine learning model, performing a task associated with the second domain, using the trained machine learning model, based on second data that is organized according to the feature arrangement.

2. The system of claim 1, wherein the operations further comprise:

receiving a transaction request associated with the first domain;
    determining, for the transaction request, transaction data corresponding to the first set of features;
    generating, using at least the transaction data, inputs for the machine learning model based on the feature arrangement;
    providing the inputs to the machine learning model; and
    obtaining an outcome from the machine learning model.

3. The system of claim 1, wherein the internal structure of the machine learning model further comprises: a third set of input nodes corresponding to a second domain-specific section of the feature arrangement that includes the second set of features.

4. The system of claim 2, wherein the generating the inputs comprises:
    generating a data structure according to the feature arrangement;
    determining a subset of the transaction data corresponding to the set of common features;
    inserting the subset of the transaction data in a first set of data fields corresponding to the domain-independent section of the data structure; and
    inserting the transaction data in a second set of data fields corresponding to the first domain-specific section of the data structure, wherein the inputs provided to the machine learning model comprise the data structure.

5. The system of claim 4, wherein the internal structure of the machine learning model further comprises a third set of input nodes corresponding to a second domain-specific section of the feature arrangement that includes the second set of features, and wherein the generating the inputs further comprises:
    inserting default values in a third set of data fields corresponding to the second domain-specific section of the data structure.

6. The system of claim 1, wherein the operations further comprise:
    obtaining a second plurality of data records comprising second data associated with the second domain and corresponding to the second set of features, wherein the generating the training data is further based on the second data.

7. The system of claim 1, wherein the first and second domains represent different services, wherein the first plurality of data records represents first transactions conducted through a first one of the different services.

8. A method, comprising:
    receiving a transaction request associated with a first domain;
    obtaining transaction data associated with the transaction request and corresponding to a first set of features to be processed by a machine learning model configured to perform tasks associated with the first domain and a second domain, wherein the machine learning model comprises an internal structure that processes data corresponding to a set of input features arranged in the feature arrangement, wherein the internal structure of the machine learning model comprises (i) a first set of input nodes corresponding to a domain-independent section of the feature arrangement that includes a set of common features that is common between the first set of features and a second set of features associated with the second domain, (ii) a second set of input nodes corresponding to a first domain-specific section of the feature arrangement that includes the first set of features, (iii) a first set of connections that connect the first set of input nodes to a first set of internal nodes of the machine learning model, and (iv) a second set of connections that connect the second set of input nodes to a second set of internal nodes of the machine learning model;

generating a data structure according to the feature arrangement for the machine learning model, wherein the data structure comprises (i) a first portion corresponding to the domain-independent section of the feature arrangement and (ii) a second portion corresponding to the first domain-specific section of the feature arrangement;

extracting, from the transaction data, a subset of the transaction data corresponding to the set of common features;

inserting the subset of the transaction data in the first portion of the data structure;

inserting the transaction data in the second portion of the data structure;

providing the data structure as input data to the machine learning model; and processing the transaction request based on an output from the machine learning model.

9. The method of claim 8, wherein the internal structure of the machine learning model further comprises a third set of input nodes corresponding to a second domain-specific section of the feature arrangement that includes the second set of features, and wherein the method further comprises:

inserting default values in a third portion of the data structure corresponding to the second domain-specific section of the feature arrangement.

10. The method of claim 9, wherein the default values comprise null values.

11. The method of claim 8, further comprising:

obtaining a first plurality of records comprising first data associated with the first domain and corresponding to the first set of features;

generating a training data record according to the feature arrangement based on a first record in the first plurality of records, wherein the generating the training data record comprises:

extracting a portion of the first record corresponding to the set of common features;

inserting the portion of the first record in the domain-independent section of the training data record; and inserting the first record in the first domain-specific section of the training data record; and training the machine learning model using the training data record.

12. The method of claim 11, wherein the internal structure of the machine learning model further comprises a third set of input nodes corresponding to a second domain-specific section of the feature arrangement that includes the second set of features, and wherein the generating the training data record further comprises inserting default values in the second domain-specific section of the training data record.

13. The method of claim 8, further comprising:

receiving a second transaction request associated with the second domain;

obtaining second transaction data associated with the second transaction request and corresponding to the second set of features;

generating a second data structure according to the feature arrangement for the machine learning model based on the second transaction data;

providing the second data structure to the machine learning model; and processing the second transaction request based on a second outcome from the machine learning model.

14. The method of claim 13, wherein the generating the second data structure further comprises:

extracting, from the second transaction data, a portion of the second transaction data corresponding to the set of common features;

inserting the subset of the second transaction data in the domain-independent section of the second data structure; and inserting the second transaction data in a second domain-specific section of the second data structure that corresponds to the second set of features.

15. A non-transitory machine-readable medium having stored thereon machine-readable instructions executable to cause a machine to perform operations comprising:

obtaining a first plurality of data records comprising first data associated with a first domain and corresponding to a first set of features;

determining a second set of features associated with a second domain different from the first domain, wherein the second set of features is different from the first set of features;

determining a set of common features between the first set of features and the second set of features, wherein the set of common features is a first subset of the first set of features, and wherein each feature in a second subset of the first set of features is not common with the second set of features;

accessing a machine learning model configured to perform tasks associated with the first domain and the second domain, wherein the machine learning model comprises an internal structure to process data corresponding to a set of input features arranged in a feature arrangement associated with the first domain and the second domain, wherein the internal structure of the machine learning model comprises (i) a first set of input nodes corresponding to a domain-independent section of the feature arrangement that includes the set of common features and having a first set of connections connecting the first set of input nodes to a first set of internal nodes of the machine learning model and (ii) a second set of input nodes corresponding to a first domain-specific section of the feature arrangement that includes the first set of features and having a second set of connections connecting the second set of input nodes to a second set of internal nodes of the machine learning model;

generating a data structure for organizing the first data in a format usable to train the machine learning model, wherein the data structure comprises a first set of data fields corresponding to the set of common features and a second set of data fields corresponding to the first set of features;

populating the data structure based on the first data; and training the machine learning model using the data structure.

16. The non-transitory machine-readable medium of claim 15, wherein the first domain is associated with a first type of transaction conducted via a first online portal, and wherein the second domain is associated with a second type of transaction conducted via a second online portal.

17. The non-transitory machine-readable medium of claim 16, wherein the first type of transaction comprises a login transaction for logging a user in to the first online portal.

18. The non-transitory machine-readable medium of claim 16, wherein the first type of transaction comprises a payment transaction for transferring funds between two accounts via the first online portal.

19. The non-transitory machine-readable medium of claim 15, wherein the internal structure of the machine learning model further comprises a third set of input nodes corresponding to a second domain-specific section of the feature arrangement that includes the second set of features, and wherein the data structure further comprises a third set of data fields corresponding to the second set of features.

20. The non-transitory machine-readable medium of claim 15, wherein the operations further comprise:

receiving a transaction request associated with the first domain;

determining, for the transaction request, transaction data corresponding to the first set of features;

generating, using at least the transaction data, input data for the machine learning model according to an arrangement associated with the data structure;

providing the input data to the machine learning model;

obtaining an outcome from the machine learning model; and processing the transaction request based on the outcome.

* * * * *